(12) United States Patent
Itoh et al.

(10) Patent No.: US 8,040,101 B2
(45) Date of Patent: Oct. 18, 2011

(54) ALTERNATING CURRENT MOTOR DRIVE CIRCUIT AND ELECTRIC VEHICLE DRIVE CIRCUIT

(75) Inventors: Jun-ichi Itoh, Nagaoka (JP); Michio Iwahori, Hino (JP); Masakazu Gekinozu, Shinagawa-ku (JP)

(73) Assignees: National University Corporation Nagaoka University of Technology (JP); Fuji Electric Co., Ltd. (JP)

( * ) Notice: Subject to any disclaimer, the term of this patent is extended or adjusted under 35 U.S.C. 154(b) by 339 days.

(21) Appl. No.: 12/352,103

(22) Filed: Jan. 12, 2009

(65) Prior Publication Data
US 2009/0206781 A1   Aug. 20, 2009

(30) Foreign Application Priority Data
Jan. 11, 2008   (JP) ................................. 2008-004128

(51) Int. Cl.
H02P 27/04   (2006.01)
(52) U.S. Cl. ........................................ 318/801; 318/800
(58) Field of Classification Search .................. 180/65.1, 180/65.29, 65.31
See application file for complete search history.

(56) References Cited

U.S. PATENT DOCUMENTS
| | | | |
|---|---|---|---|
| 2003/0146726 A1 | 8/2003 | Ishikawa et al. | |
| 2006/0038540 A1 | 2/2006 | O'Gorman et al. | |
| 2007/0241719 A1* | 10/2007 | Itoh et al. | 318/801 |

FOREIGN PATENT DOCUMENTS
| | | |
|---|---|---|
| EP | 1 535 789 A1 | 6/2005 |
| EP | 1535789 A1 * | 6/2005 |
| JP | 2000-092892 A | 3/2000 |
| JP | 2004-112883 A | 4/2004 |
| JP | 2005-318731 A | 11/2005 |
| JP | 2007-159276 A | 6/2007 |

OTHER PUBLICATIONS

Kato, Koji, et al.,"A Control Method of AC and DC Power Supply Direct Interface Converters", Institute of Electrical Engineers of Japan, Apr. 2007, pp. 51-56. Cited in specification.
Shinohara, Katsuji, et al., "Technical Trends of Direct AC/AC Converters", Institute Electrical Engineering of Japan, Trans. 1A, vol. 126, No. 9, 2006, pp. 1161-1170. Cited in specification.
Kato, Koji, et al., "Improvement of Waveform for a Boost Type AC/DC/AC Direct Converter", Institute Electrical Engineering of Japan, National Convention, 2007, 2-Pages.
Kato, Koji, et al., "Improvement of Waveform for a Boost Type AC/DC/AC Direct Converter Focused on Input Current", Institute of Electrical Engineering of Japan, Industrial Application Department Convention, 2007, pp. I-279 to I-282.
Extended European Search Report issued in corresponding EP Patent Application No. 09150122.1-2207 dated Apr. 17, 2009.

* cited by examiner

Primary Examiner — Walter Benson
Assistant Examiner — Jorge Carrasquillo
(74) Attorney, Agent, or Firm — Rossi, Kimms & McDowell LLP

(57) ABSTRACT

A current source rectifier is provided at an output of an alternating current generator, an alternating current motor is connected to an output of the rectifier via a voltage source inverter, furthermore, two arms having switching elements connected in inverse parallel to diodes are connected to the output of the rectifier, and one terminal of a direct current power source capable of a power supply and absorption is connected to a midpoint between the arms, while the other terminal thereof is connected to a neutral point of motor coils or generator coils, thereby eliminating a need for a large volumetric reactor in a direct current chopper, achieving a downsizing of the circuit.

6 Claims, 6 Drawing Sheets

ALTERNATING CURRENT MOTOR DRIVE CIRCUIT AND ELECTRIC VEHICLE DRIVE CIRCUIT

BACKGROUND OF THE INVENTION

The present invention relates to an alternating current motor drive circuit which drives an alternating current motor, using an alternating current generator and a direct current power source capable of a power supply and absorption, and to an electric vehicle drive circuit using the drive circuit.

FIG. 10 is a circuit diagram showing a first conventional example of an alternating current motor drive circuit as shown in JP-A-2004-112883, in which a three-phase output of an alternating current generator M2 is converted into a direct current by a voltage source rectifier 31 in which arms having switching elements connected in inverse parallel to diodes are bridge-connected, and the voltage of the direct current is smoothed by a capacitor 13. Also, a direct current chopper 12 is provided between the smoothed direct current (connection points N1 and N2) and a battery B, and a power exchange between them is carried out. Furthermore, using the direct current, an alternating current motor M1 is driven by a voltage source inverter 14 in which arms having switching elements (Q3 to Q8) connected in inverse parallel to diodes (D3 to D8) are bridge-connected.

Meanwhile, as an example in which an output of an alternating current generator is directly converted into an alternating current by a matrix converter, and fed to an alternating current motor, a circuit shown in FIG. 11 is also known as described in JP-A-2005-318731. FIG. 11 is a circuit diagram showing a second conventional example, realizing a power conversion between motor generators MG1 and MG2, using a matrix converter 38. Furthermore, in order to exchange power with a battery 12, a voltage source inverter 36 and a direct current chopper 32 are provided.

In the meantime, in FIG. 10, a large-capacity version of the capacitor 13 is needed for smoothing a direct current, it is difficult to downsize the circuit. Also, a reactor L1 is needed in the direct current chopper 12, there is a problem in that the circuit becomes larger due to this too.

Meanwhile, also in FIG. 11, a large direct current capacitor C2 is needed between the battery 12 and the motor generator MG2, it is difficult to downsize the circuit. Also, a reactor L1 is needed in the direct current chopper circuit 32, there is a problem in that the circuit becomes larger due to this too.

Accordingly, although not otherwise specified as being for an electric vehicle, the circuit shown in FIG. 12 is also proposed in the paper entitled "A Control Method of AC and DC Power Supply Direct Interface Converters", Institute of Electrical Engineers of Japan, The Papers of Technical Meeting on Semiconductor Power Conversion SPC-06-155, pp. 51-55. FIG. 12 is a circuit diagram showing a third conventional example, and this circuit can be used when a battery voltage is lower than a direct current link voltage. In the circuit of FIG. 12, a direct current link capacitor is omitted, but a reactor is connected. In this circuit a reference potential of a battery is a negative side potential of the direct current link, and the battery is not connected to a neutral point of a motor or generator.

Consequently, it would be desirable to particularly eliminate a need for a reactor in a direct current chopper, and achieve a downsizing of the circuit

SUMMARY OF THE INVENTION

The invention provides in an alternating current motor drive circuit which, including therein an alternating current generator and a direct current power source capable of a power supply and absorption, drives an alternating current motor, in which a current source rectifier is provided at an output of the alternating current generator, the alternating current motor is connected to an output of the rectifier via a voltage source inverter, two arms having switching elements connected in inverse parallel to diodes are connected in series to the output of the rectifier, and one terminal of the direct current power source is connected to a midpoint between the arms, while the other terminal is connected to a neutral point of coils of the alternating current motor.

In the above circuit, it is possible, instead of connecting the other terminal of the direct current power source to the neutral point of the alternating current motor coils, to connect it to a neutral point of coils of the alternating current generator.

Further, it is possible for the current source rectifier to be configured by bridge-connecting bidirectional switches, and have a filter circuit provided on an alternating current input side, or it is possible for the current source rectifier circuit to be configured by bridge-connecting unidirectional switches having a reverse blocking capability, and have a filter circuit provided on an alternating current input side.

Still further, it is possible to add an impedance between the direct current power source and any one of the midpoint between the arms, the neutral point of the alternating current motor coils, or the neutral point of the alternating current generator coils. Furthermore, it is possible to form an electric vehicle drive circuit by using the alternating current motor drive circuit which drives the alternating current generator by means of an internal combustion engine.

According to the above-described inventions, as it is possible to bidirectionally convert power of the direct current power source into a direct current link, it is possible to omit or downsize a reactor required for a conventional chopper, therefore enabling an achievement of a reduction in cost, size and weight of the drive circuit.

Further, in an application in which there is a case of causing the current source rectifier to regenerate power to the alternating current generator, it is possible to realize the drive circuit with a simple circuit configuration. Also, as the number of switches to be passed in a path through which a current flows is as small as two in the rectifier, a power conversion is efficient, too.

Still further, in an application not causing the current source rectifier to regenerate power to the alternating current generator, it is possible to form a still simpler circuit.

In addition, it being possible to downsize the alternating current generator or the alternating current motor, thereby reducing the total size of a drive system including them.

Finally, according to the invention, although in an electric vehicle drive circuit of a hybrid vehicle or the like, it is necessary to mount the circuit in a limited space, no large reactor is needed in the circuit of the invention, and thus it is possible to mount a circuit which produces a high output, which makes it possible to improve an acceleration and deceleration performance of an electric vehicle.

Still other features and advantages of the invention will become apparent to those skilled in the art from the following detailed description of the preferred embodiments.

BRIEF DESCRIPTION OF THE DRAWINGS

The invention will be described with reference to certain preferred embodiments thereof and the accompanying drawings, wherein.

DESCRIPTION OF THE PREFERRED EMBODIMENTS

Figure 1:
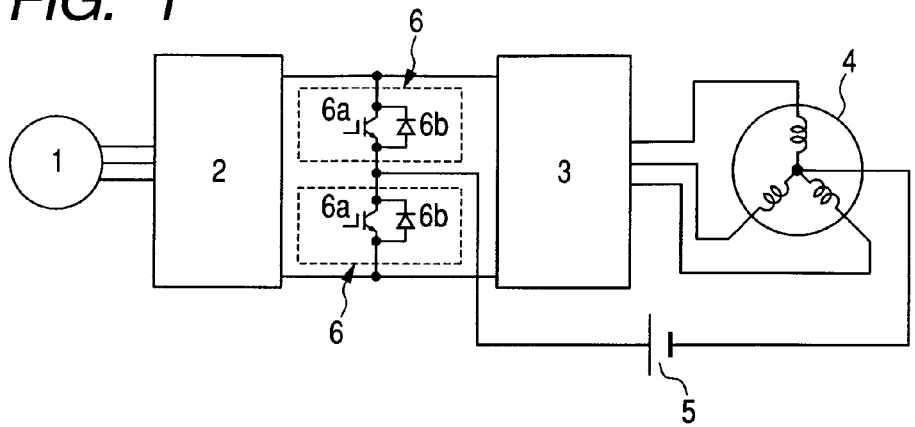
FIG. 1 is a circuit diagram showing an embodiment of the invention.
Figure 10:
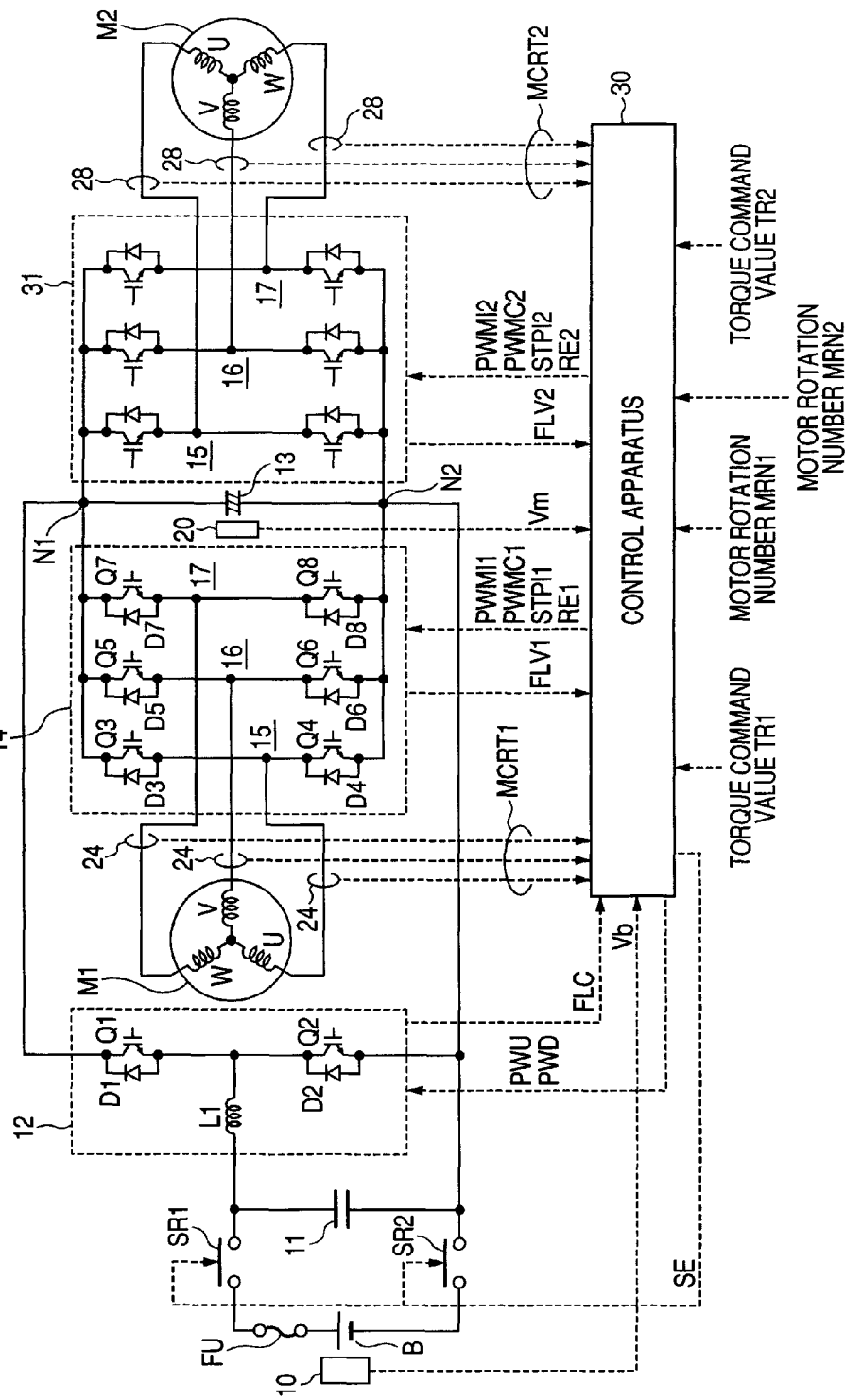
FIG. 10 is a circuit diagram showing a first conventional example.
Figure 11:
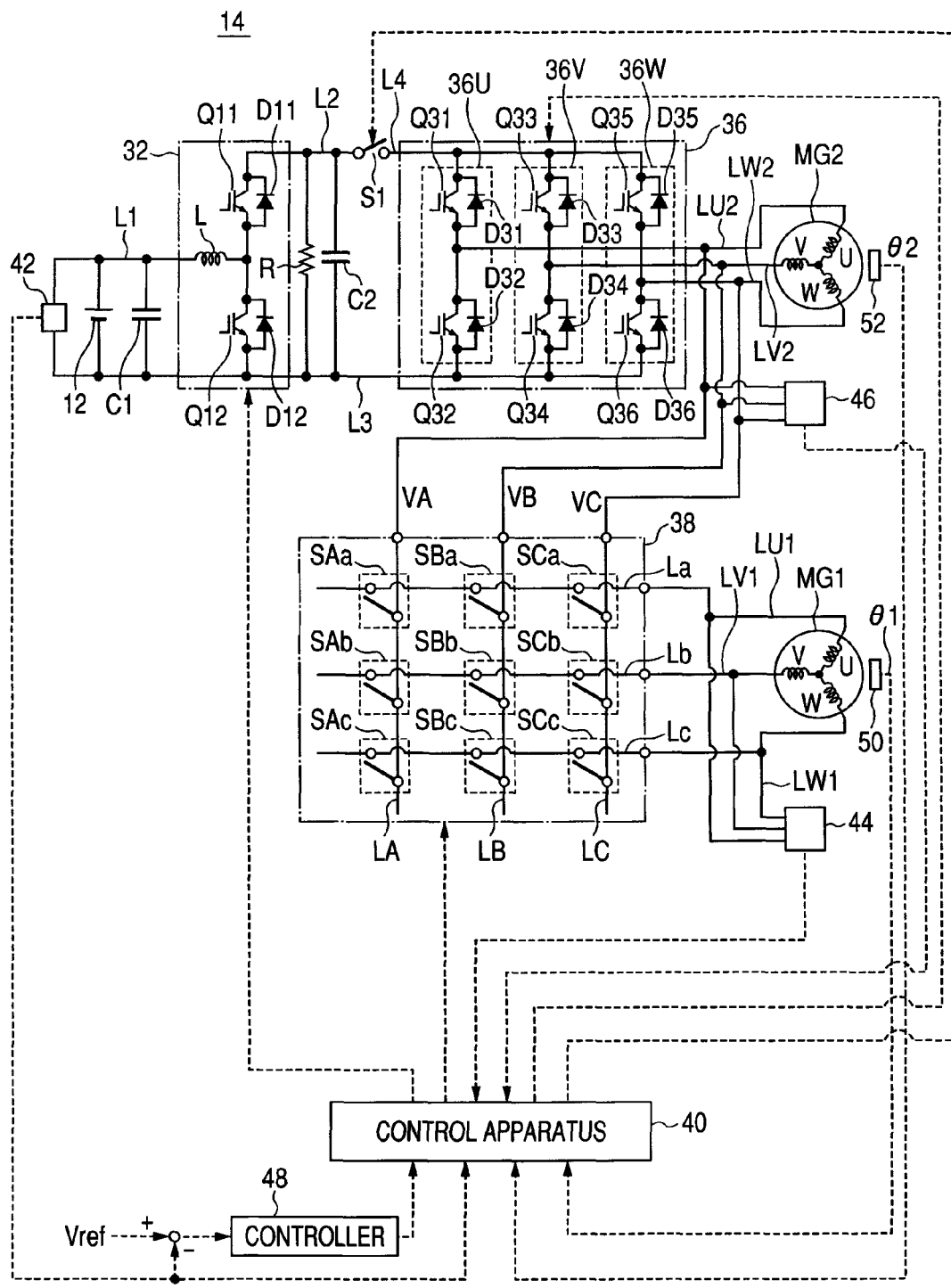
FIG. 11 is a circuit diagram showing a second conventional example.

FIG. 1 is a configuration diagram showing an embodiment of the invention. As shown in FIG. 1, in this example, a current source rectifier 2 and a voltage source inverter 3 are connected to an output of a three-phase alternating current generator 1, and an alternating current motor 4 is driven by the output thereof. The combination of the current source rectifier 2 and voltage source inverter 3 being called, for example, an Indirect Matrix Converter, as disclosed in "Technical Trends of Direct AC/AC Converters", Institute of Electrical Engineers of Japan Transactions on Industry Application, Vol. 126, No. 9, pp. 1161-1170, by employing a current source rectifier as a rectifier, a need for a large part, such as the capacitor 13 shown in FIG. 10, is eliminated.

Also, two arms 6 having switching elements 6a connected in inverse parallel to diodes 6b are connected in series to an output of the rectifier 2. Furthermore, a positive terminal of a storage battery 5 is connected to a midpoint between the two series-connected arms 6, while a negative terminal thereof is connected to a neutral point of the alternating current motor 4. Herein, in this example, the storage battery 5 is used as a direct current power source capable of a power supply and absorption, but it goes without saying that it is possible, in its place, to use a capacitor or a direct current power source to which a storage battery or the like is connected via a DC-DC converter such as a direct current chopper capable of a bidirectional power conversion.

With the kind of configuration of FIG. 1, a power conversion between an output of the alternating current generator 1 and an input of the alternating current motor 4 is realized by, after once converting power into a direct current by means of the current source rectifier 2, converting it into an alternating current by means of the voltage source inverter 3. Also, a power conversion between the storage battery 5 and the output of the rectifier 2 is realized by controlling a zero vectors of the voltage source inverter 3 by means of a switching of each arm thereof, as well as appropriately carrying out the switching of the two series-connected arms 6.

That is, by connecting the negative terminal of the storage battery 5 to the neutral point of the alternating current motor 4, it is possible to form a chopper circuit using an inductance component of three parallel coils of the alternating current motor 4 and the two series-connected arms 6, enabling the bidirectional exchange of the direct current power between the output of the rectifier 2 and the storage battery 5.

Figure 12:
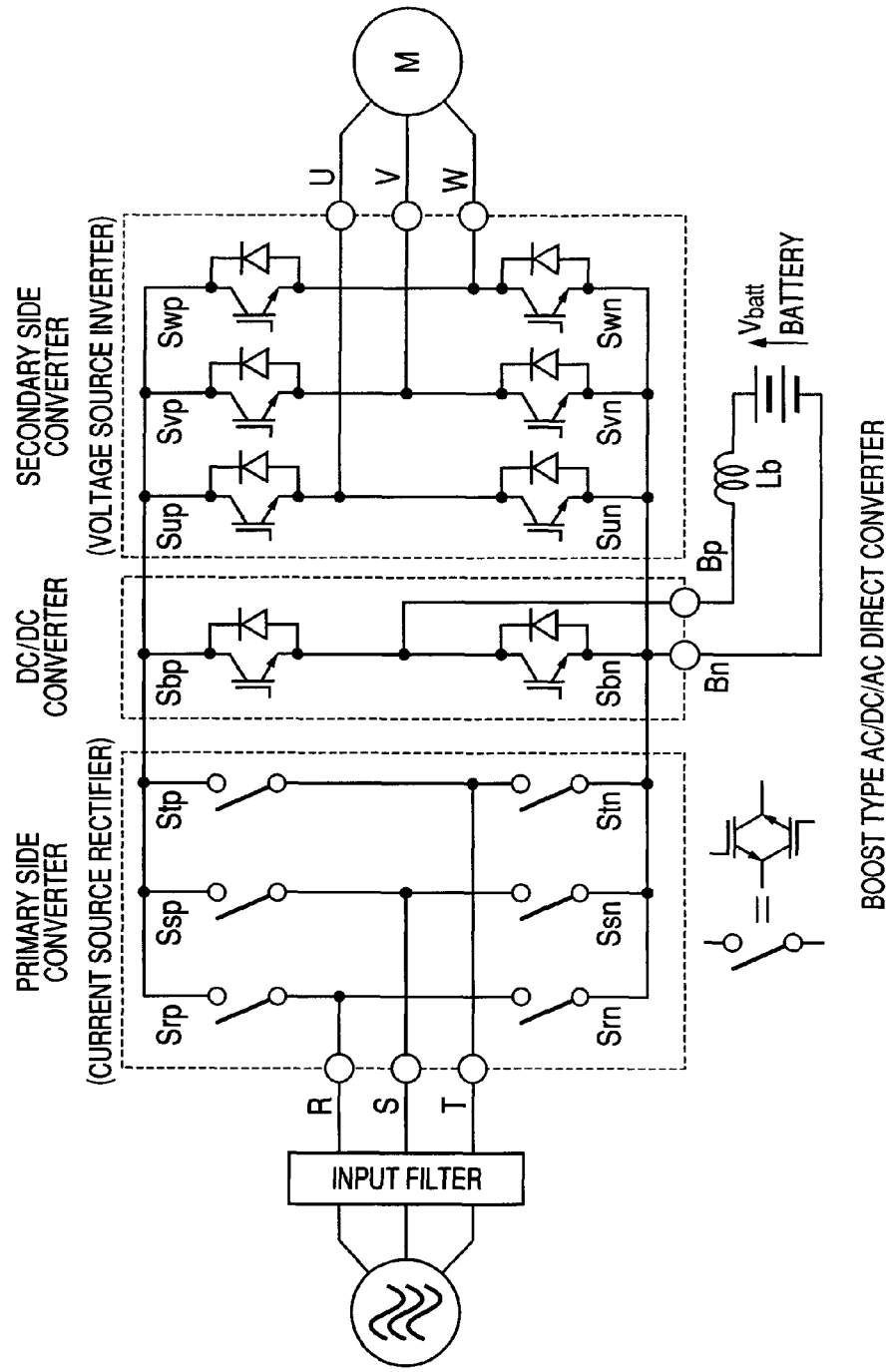
FIG. 12 is a circuit diagram showing a third conventional example.

Also, in the circuit shown in FIG. 12, in order to exchange the direct current power between the output of the rectifier and the storage battery, a large reactor is needed, however, by adopting the heretofore described configuration, the inductance component of the coils of the alternating current motor 4 is used, and thus the need for the large reactor is eliminated.

As a result, for example, by supplying both the power obtained by converting the output of the alternating current generator 1 into the direct current by the rectifier 2, and the power supplied from the storage battery 5, it is possible to drive the alternating current motor 4 by the voltage source inverter 3 on high power. It is also possible to drive the alternating current motor 4 by the voltage source inverter 3, by using the power obtained by rectifying the output of the alternating current generator 1, and charging the storage battery 5 with the surplus power thereof, and so on. Furthermore, it is possible, at a time of braking the alternating current motor 4, to turn the flow of power in a direction opposite to that at a time of driving, supplying power to the alternating current generator 1 or the storage battery 5, and so on.

With the circuit of FIG. 1, it is possible to realize the following six operation modes in accordance with the charge and discharge of the storage battery 5, and the drive and braking of the alternating current motor 4.

Figure 2:
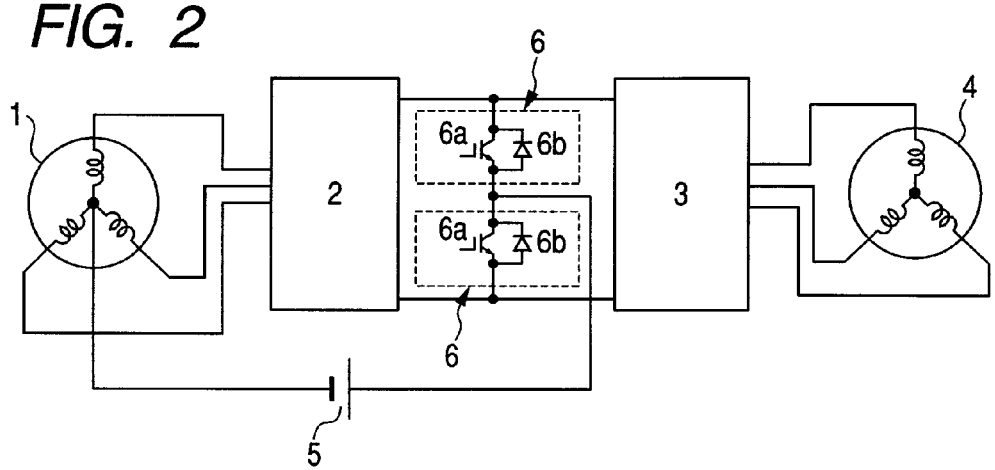
FIG. 2 is a circuit diagram showing a first modification example of FIG. 1.

1) Generator: generating,
   storage battery: charging,
      motor: powering
2) Generator: generating,
   storage battery: charging,
      motor: braking
3) Generator: generating,
   storage battery: discharging,
      motor: powering
4) Generator: regenerating,
   storage battery: charging,
      motor: braking
5) Generator: regenerating,
   storage battery: discharging,
      motor: powering
6) Generator: regenerating,
   storage battery: discharging,
      motor: braking FIG. 2 shows a first modification example of FIG. 1. As shown in the figure, it is different from FIG. 1 in that one terminal of the storage battery 5 is connected to a neutral point of the alternating current generator 1, rather than to the neutral point of the alternating current motor 4. In this circuit, by appropriately carrying out the switching of the two series-connected arms 6 and the switches in the rectifier 2, the power conversion between the storage battery 5 and the output of the rectifier 2 being possible, the powering operation and braking operation of the alternating current motor 4 are possible in the same way as in FIG. 1.

Figure 3:
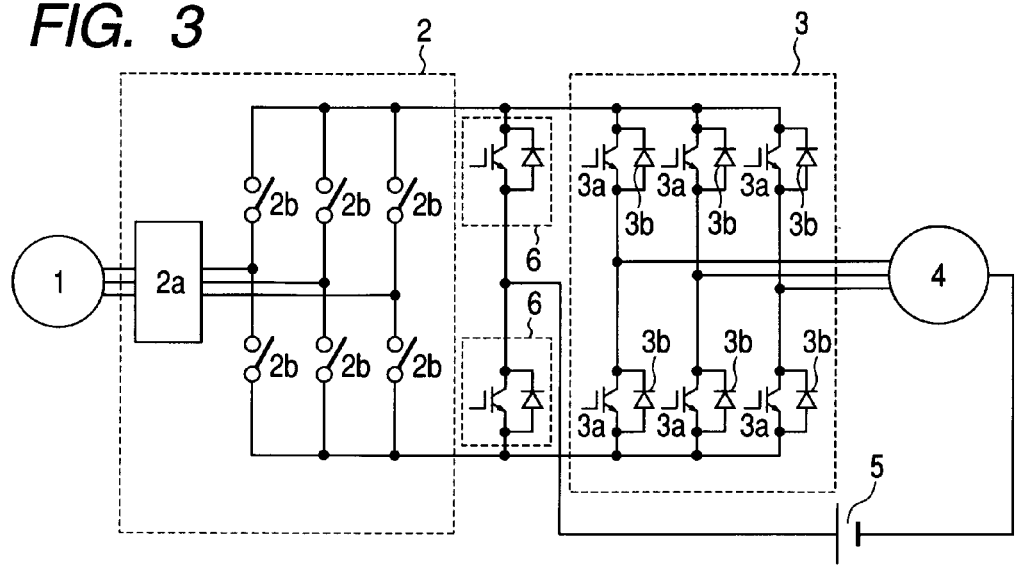
FIG. 3 is a circuit diagram showing a second modification example of FIG. 1.
Figure 4:
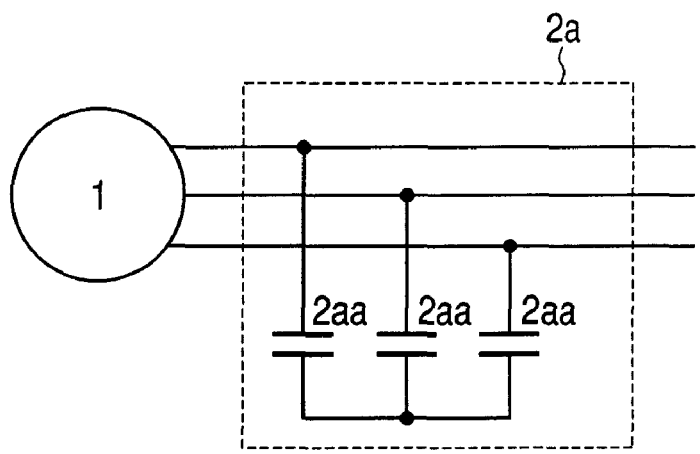
FIG. 4 is a circuit diagram showing a first specific example of a filter circuit used in FIG. 3.
Figure 5:
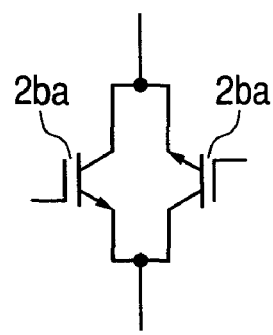
FIG. 5 is a circuit diagram showing a first specific example of bidirectional switches used in FIG. 3.
Figure 6:
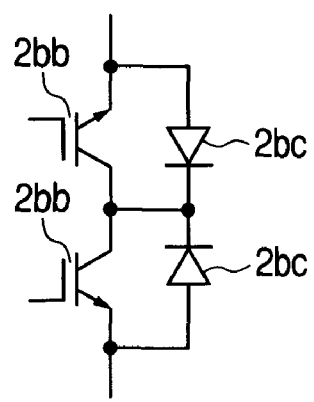
FIG. 6 is a circuit diagram showing a second specific example of the bidirectional switches used in FIG. 3.

FIG. 3 shows a second modification example of FIG. 1. This circuit has a feature in that a filter circuit 2a is provided at the input of the current source rectifier 2, and bidirectional switches 2b are bridge-connected. Also, in the voltage source inverter 3 too, individual arms are embodied by switching elements 3a and diodes 3b. The filter circuit 2a can be configured by, for example, star-connecting capacitors 2aa, as in FIG. 4, utilizing an inductance of coils of the alternating current generator 1. Also, as the bidirectional switches 2b, switching elements 2ba having a reverse blocking capability in themselves are connected, as shown in FIG. 5. Alternatively, in a case of using switching elements 2*bb* having no reverse blocking capability in themselves, it is possible to connect them as well as diodes 2*bc*, as shown in FIG. 6.

Figure 7:
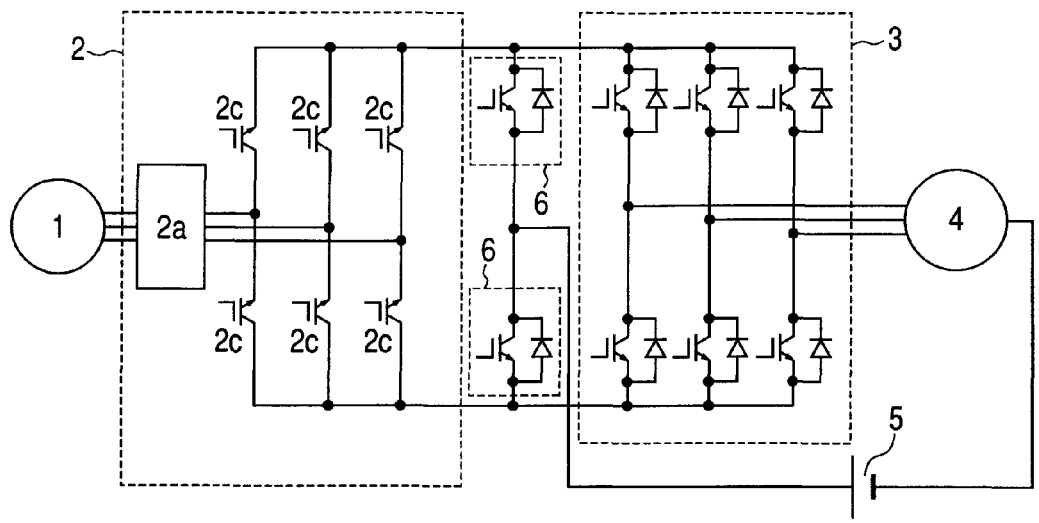
FIG. 7 is a circuit diagram showing a third modification example of FIG. 1.

FIG. 7 shows a third modification example of FIG. 1. In this example, the bidirectional switches 2*b* of FIG. 3 are replaced with unidirectional switches 2*c* having a reverse blocking capability. Instead of so doing, it can also be configured of a circuit in which switching elements having no reverse blocking capability are connected in series with diodes.

Figure 8:
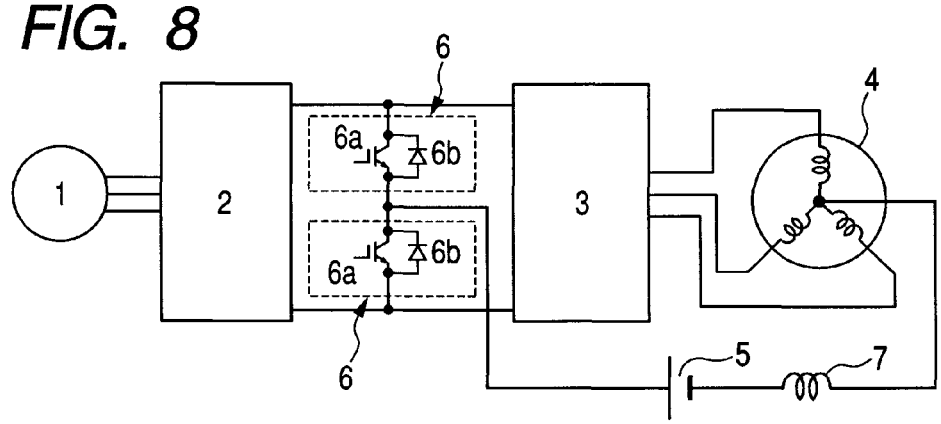
FIG. 8 is a circuit diagram showing a fourth modification example of FIG. 1.

FIG. 8 shows a fourth modification example of FIG. 1. This is configured by adding a reactor 7, as an impedance, to the circuit of FIG. 1. It is also acceptable to add the reactor 7 between the storage battery 5 and the midpoint between the arms 6. Also, it is possible to add the reactor 7 between the storage battery 5 and the generator 1, or between the storage battery 5 and the midpoint between the arms 6, shown in the circuit of FIG. 2.

Here, it is also acceptable that the reactor 7 is a small one having an inductance lower than the inductance of the a conventional chopper. That is, as heretofore described, the chopper circuit using the inductance component of the coils of the alternating current motor 4 and the two series-connected arms 6 is formed but, depending on a capacity of a selected motor, it may happen that an inductance component of coils of an alternating current motor is low (or high), interfering with a chopper operation. In this kind of case, an impedance is added to a path between the coils of the alternating current motor and a storage battery, adjusting the inductance to become a size suitable for the chopper operation.

As a chopper circuit is insufficient in inductance to carry out a chopper operation only with the inductance component of coils of an alternating current motor, the above-described example is the one in which, in order to compensate the deficiency, a small reactor is connected in series.

Figure 9:
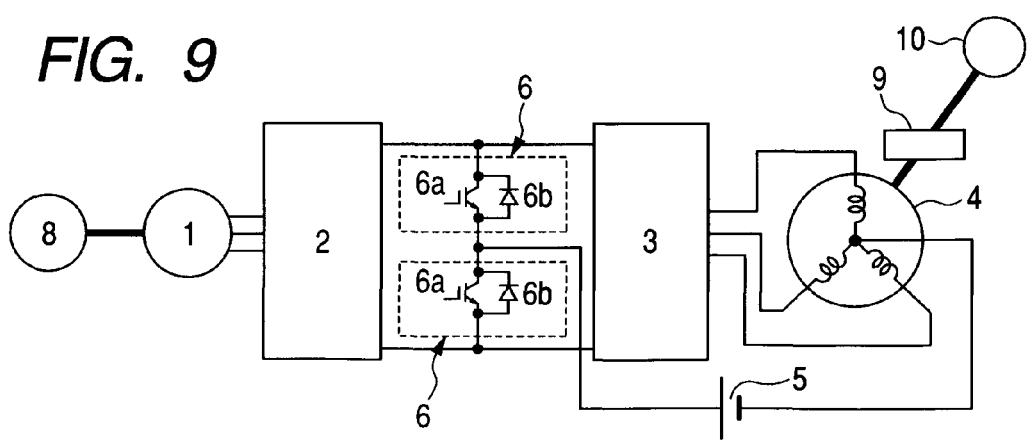
FIG. 9 is a circuit diagram showing an application example of FIG. 1.

FIG. 9 shows an application example of FIG. 1. This is the one in which an electric vehicle drive circuit is formed by adding an internal combustion engine 8 to FIG. 1, mechanically connecting it to the alternating current generator 1, and mechanically connecting a wheel 10 to an output shaft of the alternating current motor 4 to via a gear 9. It goes without saying that the internal combustion engine 8 can also be applied to the circuit of FIG. 2.

This application is based on, and claims priority to, Japanese Patent Application No: 2008-004128, filed on Jan. 11, 2008. The disclosure of the priority application, in its entirety, including the drawings, claims, and the specification thereof, is incorporated herein by reference.

What is claimed is:

1. An apparatus comprising:
an alternating current generator;
a current source rectifier coupled to the alternating current generator;
an alternating current motor is connected to an output of the current source rectifier via a voltage source inverter, two arms having switching elements connected in inverse parallel to diodes are connected in series to the output of the rectifier,
a direct current power source capable of a power supply and absorption, wherein one terminal of the direct current power source is connected to a midpoint between the two arms, while a second terminal is connected to either a neutral point of coils of the alternating current motor or to a neutral point of coils of the alternating current generator.

2. The apparatus according to claim 1, wherein the current source rectifier, being configured by bridge-connecting bidirectional switches, has a filter circuit provided on an alternating current input side.

3. The apparatus according to claim 1, wherein the current source rectifier, being configured by bridge-connecting unidirectional switches having a reverse blocking capability, has a filter circuit provided on an alternating current input side.

4. The apparatus according to claim 1, wherein an impedance is added between the direct current power source and any one of the midpoint between the arms, the neutral point of the alternating current motor coils, or the neutral point of the alternating current generator coils.

5. An apparatus as claimed in claim 1, further comprising an internal combustion engine coupled to the alternating current generator.

6. An apparatus as claimed in claim 1, further comprising a wheel mechanically coupled to the alternating current motor.

* * * * *